US012775185B2

(12) United States Patent
Park et al.

(10) Patent No.: US 12,775,185 B2
(45) Date of Patent: Oct. 27, 2026

(54) DISPLAY APPARATUS

(71) Applicant: SAMSUNG ELECTRONICS CO., LTD., Suwon-si (KR)

(72) Inventors: Chanhong Park, Suwon-si (KR); Jongseong Kim, Suwon-si (KR); Keunbae Jeon, Suwon-si (KR); Sungho Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/261,410

(22) Filed: Jul. 7, 2025

(65) Prior Publication Data

US 2025/0334836 A1 Oct. 30, 2025

Related U.S. Application Data

(63) Continuation of application No. PCT/KR2023/019393, filed on Nov. 29, 2023.

(30) Foreign Application Priority Data

Jan. 20, 2023 (KR) ........................ 10-2023-0008913

(51) Int. Cl.
*G02F 1/13357* (2006.01)

(52) U.S. Cl.
CPC .. *G02F 1/133608* (2013.01); *G02F 1/133603* (2013.01)

(58) Field of Classification Search
CPC ..................... G02F 1/133603; G02F 1/133608
USPC ............................ 362/97.1, 97.2, 97.3, 97.4
See application file for complete search history.

(56) References Cited

U.S. PATENT DOCUMENTS

| | | | | |
|---|---|---|---|---|
| 6,255,581 | B1 | 7/2001 | Reis et al. | |
| 11,224,135 | B2 | 1/2022 | Song et al. | |
| 11,520,177 | B2 | 12/2022 | Lee et al. | |
| 11,714,303 | B2 * | 8/2023 | Li | G02F 1/1336 362/97.1 |
| 2016/0302303 | A1 | 10/2016 | Kim et al. | |
| 2017/0164487 | A1 * | 6/2017 | Kim | G06F 1/1601 |

(Continued)

FOREIGN PATENT DOCUMENTS

| | | | |
|---|---|---|---|
| JP | 2004-311531 | A | 11/2004 |
| JP | 2021-135481 | A | 9/2021 |

(Continued)

OTHER PUBLICATIONS

International Search Report and Written Opinion (PCT/ISA/220, PCT/ISA/210, and PCT/ISA/237) dated Feb. 20, 2024, issued by International Searching Authority for International Application No. PCT/KR2023/019393.

*Primary Examiner* — Thomas M Sember

(74) *Attorney, Agent, or Firm* — Sughrue Mion, PLLC

(57) ABSTRACT

A display apparatus includes a display panel that displays an image, and a light source that supplies light to the display panel. The light source is provided on a rear side of the display panel. A chassis is provided on a rear side of the light source, the chassis including a cover body covering a rear surface of the light source, and a support protrusion, that is bent, protruding from a rear surface of the cover body. A substrate is supported by the support protrusion and provided between the cover body and the support protrusion, wherein the substrate is soldered to the chassis from one surface thereof.

9 Claims, 10 Drawing Sheets

(56) References Cited

U.S. PATENT DOCUMENTS

| | | | | |
|---|---|---|---|---|
| 2021/0267090 | A1 | 8/2021 | Saito | |
| 2021/0382336 | A1* | 12/2021 | Lee | G02F 1/133602 |

FOREIGN PATENT DOCUMENTS

| | | | |
|---|---|---|---|
| KR | 2000-0009197 | U | 5/2000 |
| KR | 10-2005-0061960 | A | 6/2005 |
| KR | 10-0680015 | B1 | 2/2007 |
| KR | 10-0772163 | B1 | 10/2007 |
| KR | 10-1340994 | B1 | 12/2013 |
| KR | 10-2016-0120496 | A | 10/2016 |
| KR | 10-2020-0042717 | A | 4/2020 |
| KR | 10-2020-0060335 | A | 5/2020 |
| KR | 10-2021-0027615 | A | 3/2021 |
| KR | 10-2021-0085386 | A | 7/2021 |

* cited by examiner

DISPLAY APPARATUS

CROSS-REFERENCE TO RELATED APPLICATIONS

This application is a bypass continuation of International Application No. PCT/KR2023/019393, filed on Nov. 29, 2023, which is based on and claims priority to Korean Patent Application No. 10-2023-0008913, filed on Jan. 20, 2023, in the Korean Intellectual Property Office, the disclosures of which are incorporated by reference herein in their entireties.

BACKGROUND

1. Field

The present disclosure relates to a display apparatus including a liquid crystal panel and a back light unit (BLU).

2. Description of Related Art

In general, a display apparatus is a type of output device that converts acquired or stored electrical information into visual information and displays it to a user, and is used in various fields such as households and business environments.

The display apparatus includes a back light unit (BLU) that provides light to a liquid crystal panel, and the back light unit includes a plurality of point light sources capable of emitting light independently. The light source may include, for example, a light emitting diode (LED) or an organic light emitting diode (OLED).

In addition, the display apparatus may include a control assembly that transmits an external signal to the liquid crystal panel, or a power assembly that supplies power to the liquid crystal panel and the control assembly.

SUMMARY

An embodiment of the present disclosure provides a display apparatus having an improved structure for preventing damage to a printed circuit board.

An embodiment of the present disclosure provides a display apparatus that extends grounding by electrically connecting a printed circuit board and a bottom chassis.

Technical problems to be solved by this document are not limited to the above-mentioned technical problems, and other technical problems, which are not described above, may be clearly understood from the following descriptions by those skilled in the art to which the present disclosure pertains.

According to an aspect of the disclosure, there is provided a display apparatus, including: a display panel configured to display an image; a light source configured to supply light to the display panel, the light source being provided on a rear side of the display panel; a chassis provided on a rear side of the light source, the chassis including a cover body covering a rear surface of the light source, and a support protrusion, that is bent, protruding from a rear surface of the cover body; and a substrate supported by the support protrusion and provided between the cover body and the support protrusion, wherein the substrate is configured to be soldered to the chassis from one surface thereof.

The one surface of the substrate may be a rear surface of the substrate, and the substrate may be soldered rearward toward the support protrusion.

The support protrusion may include: a support portion connected to the cover body; and a bending portion extending from the support portion in parallel with the cover body, and wherein the substrate may be soldered to the bending portion.

The substrate may be spaced apart from the cover body and the bending portion.

The one surface of the substrate may be a front surface of the substrate, and the substrate may be soldered forward to be connected to the chassis.

The substrate may be soldered to the rear surface of the cover body.

A soldering portion, which may be provided to protrude from the one surface of the substrate and be connected to the chassis, may be provided in a plurality of soldering portions that are arranged in one direction, which may be a length direction of the display panel.

The plurality of soldering portions are arranged spaced apart from each other in the one direction.

The plurality of soldering portions are arranged continuously in the one direction.

The substrate may be provided on one rear side of the chassis so as to be connected to the display panel via a chip on film (COF).

The substrate may be provided on an upper rear side of the chassis, and wherein the support protrusion may include: a support portion connected to the cover body; and a bending portion that extends upward from the support portion. 12. The display apparatus of claim 1, wherein the chassis is metal.

BRIEF DESCRIPTION OF THE DRAWINGS

The above and other aspects and/or features of embodiments of the disclosure will be more apparent from the following description taken in conjunction with the accompanying drawings, in which.

DETAILED DESCRIPTION

Figure 1:
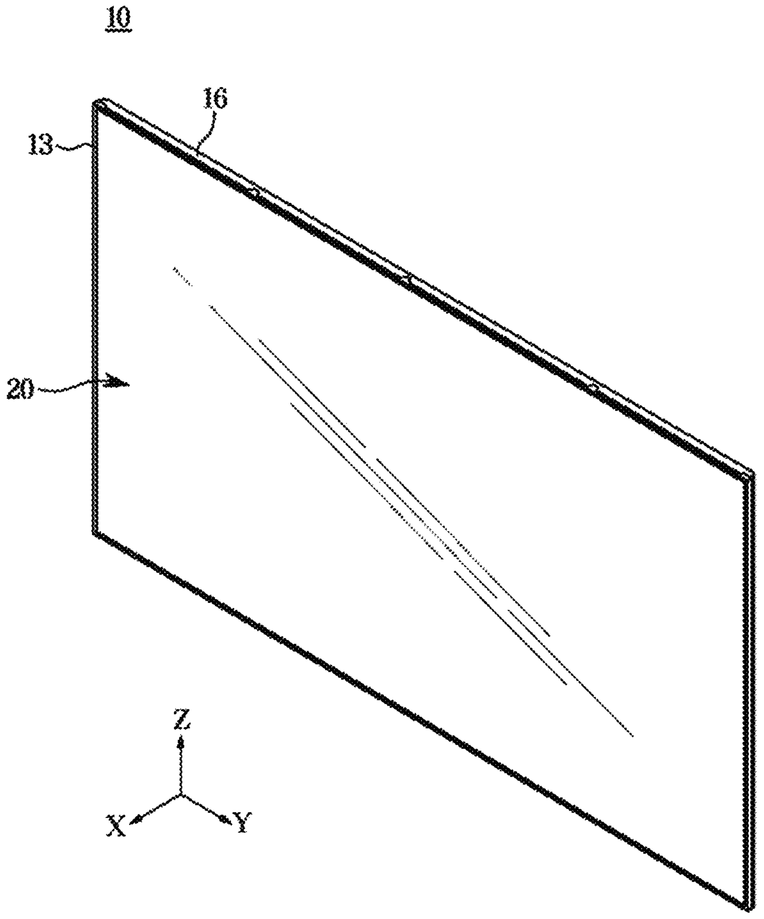
FIG. 1 is a perspective view illustrating a display apparatus according to an embodiment of the present disclosure.

Various embodiments of this document and the terms used in the embodiments are not intended to limit the technical features disclosed in this document to the particular embodiments and should be understood as including various alterations, equivalents, or alternatives of the corresponding embodiments.

In connection with the description of the drawings, the similar reference numerals may be used for the similar or relevant constituent elements.

The singular form of a noun corresponding to an item may include one or plurality of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

The term "and/or" includes a combination of a plurality of related constituent elements or any constituent element among the plurality of related constituent elements.

Such terms as "1st" and "2nd," or "first" and "second" may be used to simply distinguish a corresponding constituent element from another, and does not limit the constituent elements in other aspect (e.g., importance or order).

When a constituent element (e.g., a first constituent element) is referred to, with or without the term "operatively" or "communicatively," as "coupled with," "coupled to," "connected with," or "connected to" another constituent element (e.g., a second constituent element), it means that the constituent element may be coupled with the other constituent element directly (e.g., wiredly), wirelessly, or via a third constituent element.

It should be understood the terms "comprises," "comprising," "includes," "including," "containing," "has," "having" or other variations thereof are inclusive and therefore specify the presence of stated features, integers, steps, operations, elements, components, or combinations thereof disclosed in this document, but do not preclude the presence or addition of one or more other features, integers, steps, operations, elements, components, or combinations thereof.

When a constituent element is said to be "connected," "coupled," "supported," or "in contact" with another constituent element, this includes not only cases where the constituent elements are directly connected, coupled, supported, or in contact with each other, but also cases where they are indirectly connected, coupled, supported, or in contact through a third constituent element.

When a constituent element is said to be positioned "on" another constituent element, this includes not only cases where the constituent element is in direct contact with the other constituent element, but also cases where another constituent element exists between the two constituent elements.

Hereinafter, in describing an embodiment of the present disclosure, for convenience of explanation, a display apparatus, which is one type of electronic device, is described as an example, but the spirit of the present disclosure is not limited thereto.

Hereinafter, embodiments according to the present disclosure will be described in detail with reference to the accompanying drawings.

An electronic device according to an embodiment of the present disclosure may be a display apparatus 10.

Figure 2:
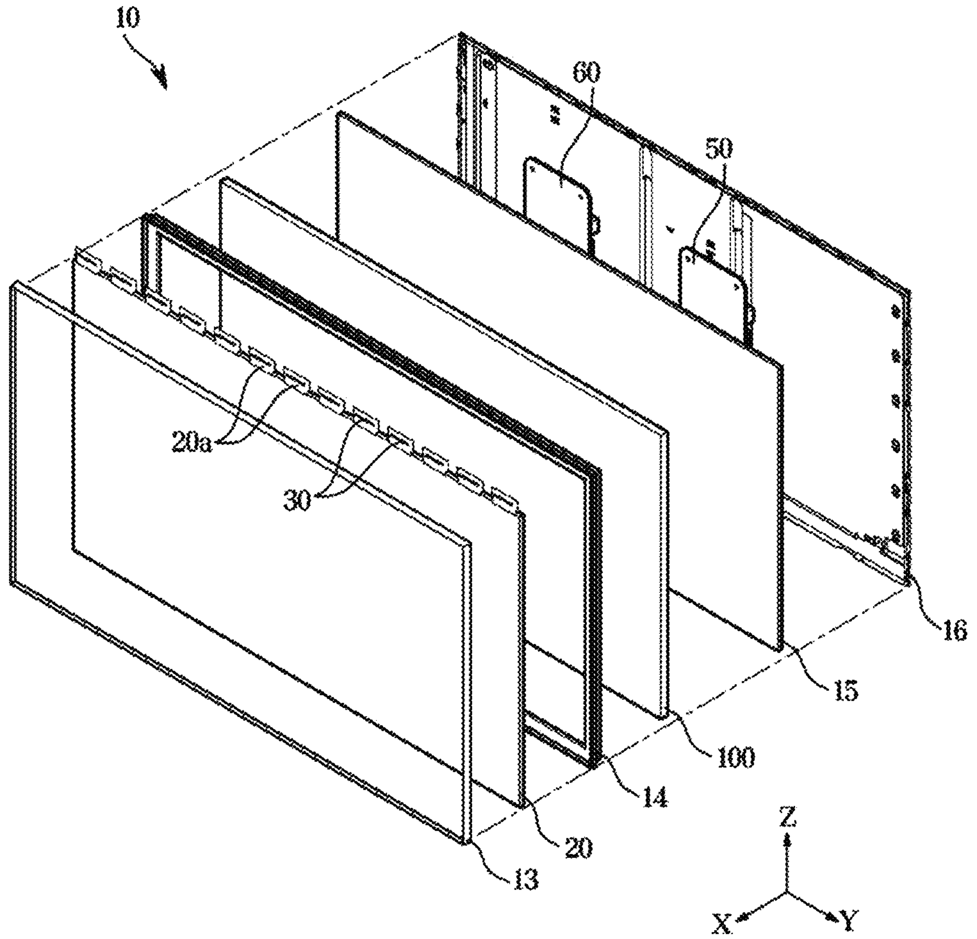
FIG. 2 is an exploded perspective view illustrating a display apparatus according to an embodiment of the present disclosure.
Figure 3:
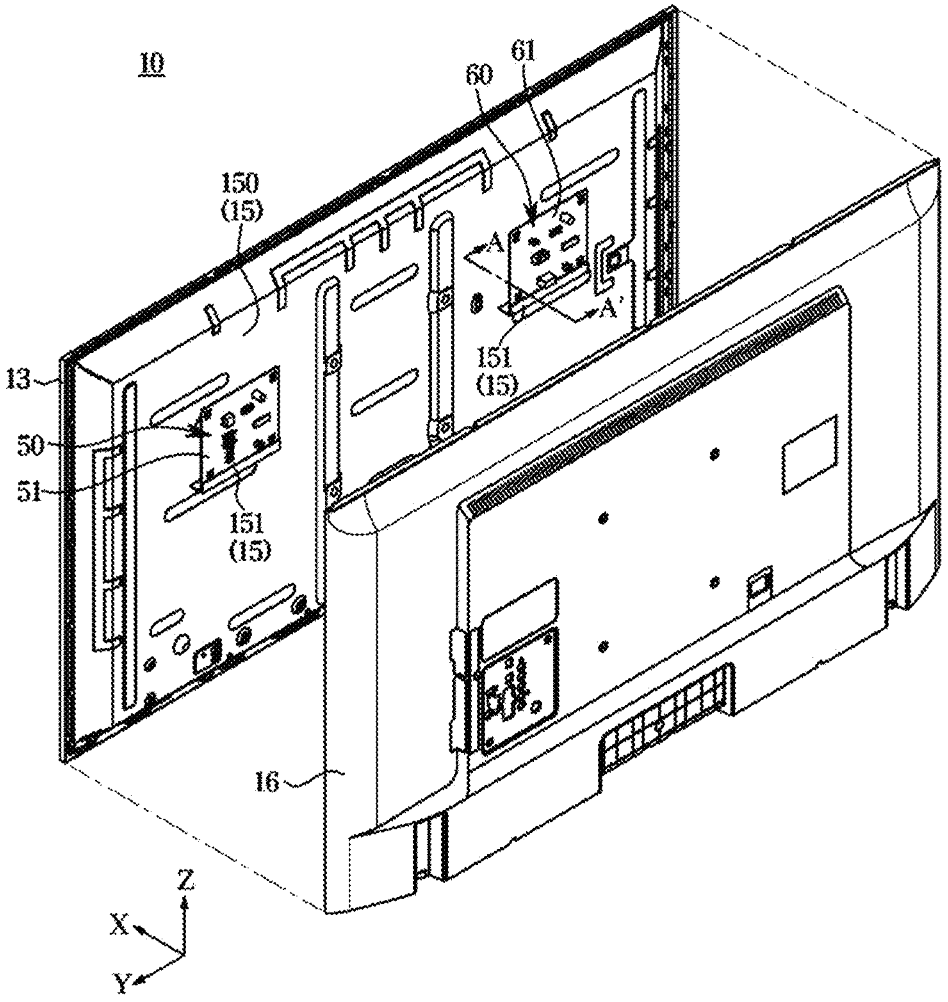
FIG. 3 is a rear perspective view illustrating a rear cover of the display apparatus after the rear cover has been disassembled, according to an embodiment of the present disclosure.

FIG. 1 is a perspective view illustrating a display apparatus according to an embodiment of the present disclosure. FIG. 2 is an exploded perspective view illustrating a display apparatus according to an embodiment of the present disclosure. FIG. 3 is a rear perspective view illustrating a rear cover of the display apparatus after the rear cover has been disassembled, according to an embodiment of the present disclosure.

With reference to FIGS. 1 to 3, the display apparatus 10 is an apparatus that processes an image signal received from the outside and may visually display the processed image. Hereinafter, although a case in which the display apparatus 10 is a television (TV) is exemplified, the present disclosure is not limited thereto. For example, the display apparatus 10 may be implemented in various forms such as a monitor, a portable multimedia device, or a portable communication device, and the form of the display apparatus 10 is not limited as long as it is an apparatus that visually displays images.

In addition, the display apparatus 10 may be a large format display (LFD) installed outdoors, such as on the rooftop of a building or at a bus stop. Here, outdoors is not necessarily limited to open-air environments, and even indoor places where a large number of people come and go, such as subway stations, shopping malls, movie theaters, companies, or stores, may be places where the display apparatus 10 according to an embodiment of the present disclosure may be installed.

The display apparatus 10 may receive content including a video signal and an audio signal from various content sources, and may output images and audio corresponding to the video signal and the audio signal. For example, the display apparatus 10 may receive content data through a broadcast receiving antenna or a wired cable, may receive content data from a content playback device, or may receive content data from a content providing server of a content provider.

Inside the display apparatus 10, components for the display apparatus 10 to display images or perform various functions may be provided. The display apparatus 10 illustrated in FIG. 1 has a flat plate shape, but the shape of the display apparatus 10 is not limited to the example illustrated in FIG. 1. For example, the display apparatus 10 may have a curved plate shape.

The display apparatus 10 may be configured to display a screen. Specifically, the display apparatus 10 may include a display panel 20 that displays an image on a front side thereof (for example, in an X direction).

A plurality of pixels may be formed in the display panel 20, and a screen displayed on the display panel 20 may be formed by a combination of light emitted from the plurality of pixels. For example, a single screen may be formed by the combination of light emitted from the plurality of pixels like a mosaic.

Each of the plurality of pixels may emit light of various brightness levels and various colors. Specifically, each of the plurality of pixels may include sub-pixels, and the sub-pixels may include a red sub-pixel that may emit red light, a green sub-pixel that may emit green light, and a blue sub-pixel that may emit blue light. For example, the red light may represent light having a wavelength of approximately 700 nm (nanometer, one-billionth of a meter) to 800 nm. The green light may represent light having a wavelength of approximately 500 nm to 600 nm. The blue light may represent light having a wavelength of approximately 400 nm to 500 nm.

Each of the plurality of pixels may emit light of various brightness levels and various colors by a combination of light emitted respectively from the sub-pixel, the green sub-pixel, and the blue sub-pixel.

As illustrated in FIG. 2, the display apparatus 10 may be provided with a back light unit 100, which is a surface light source, a display panel 20 that blocks or transmits light emitted from the back light unit 100, a back light unit 100, and a power assembly 50 that supplies power to the back light unit 100 and the display panel 20, and a control assembly 60 that controls the operation of the display panel 20. In addition, the display apparatus 10 may include a top chassis 13, a middle mold 14, a bottom chassis 15, and a rear cover 16 to support the display panel 20, the back light unit 100, the power assembly 50, and the control assembly 60.

However, the configuration of the power assembly 50 and the control assembly 60 may be provided as a single assembly, and the power assembly 50 and the control assembly 60 may be provided separately, and may be arranged in a manner opposite to the arrangement illustrated in FIG. 2, such that the control assembly 60 is disposed (e.g., provided) on the right side (for example, in a Y direction) of the power assembly 50.

The back light unit 100 may include a point light source that emits white light. In addition, the back light unit 100 may refract, reflect, and scatter light in order to convert light emitted from the point light source into uniform surface light. As such, the back light unit 100 may emit uniform surface light forward by refracting, reflecting, and scattering the light emitted from the point light source.

The display panel 20 is provided on a front side (for example, in an X direction) of the back light unit 100, and blocks or transmits the light emitted from the back light unit 100 to form an image.

The front surface of the display panel 20 forms the screen of the display apparatus 10, and the display panel 20 may form a plurality of pixels. The display panel 20 may block or transmit the light of the back light unit 100 for each of the plurality of pixels, independently. In addition, the light transmitted by the plurality of pixels may form an image displayed on the screen.

On one side of the display panel 20, a cable 20*a*, which transmits image data to the display panel 20, and a display driver integrated circuit (DDI) 30, which processes digital image data and outputs an analog image signal (hereinafter referred to as a panel driver), may be provided.

The cable 20*a* may electrically connect the power assembly 50 and the control assembly 60 to the panel driver 30, and may also electrically connect the panel driver 30 to the liquid crystal panel 20. The cable 20*a* may include a flexible flat cable or a film cable, or the like, which may be bendable.

The panel driver 30 may receive image data and power from the power assembly 50 and the control assembly 60 through the cable 20*a*. In addition, the panel driver 30 may provide image data and driving current to the display panel 20 through the cable 20*a*.

In addition, the cable 20*a* and the panel driver 30 may be integrally implemented in the form of a film cable, chip on film (COF), tape carrier package (TCP), or the like. In other words, the panel driver 30 may be disposed on the cable 20*a*. However, the present disclosure is not limited thereto, and the panel driver 30 may be disposed on the display panel 20.

The cable 20*a* and the panel driver 30 may be disposed on one side of the display panel 20. More specifically, the cable 20*a* and the panel driver 30 may be disposed on an upper side (for example, in a Z-direction) or a lower side (for example, in a-Z-direction) of the display panel 20, and may be connected to the power assembly 50 and the control assembly 60. In addition, the cable 20*a* and the panel driver 30 may be disposed on a left side (for example, in a-Y direction) or a right side (for example, in a Y direction) of the display panel 20.

The power assembly 50 may include a power circuit that supplies power to the display panel 20 and the back light unit 100. The power circuit may supply power to the control assembly 60, the back light unit 100, and the display panel 20.

The control assembly 60 may include a control circuit that controls the operation of the display panel 20 and the back light unit 100. For example, the control circuit may process a video signal and/or an audio signal received from an external content source. The control circuit may transmit image data to the display panel 20.

The power assembly 50 may be implemented with a first printed circuit board 51 and various circuits mounted on the first printed circuit board 51. The control assembly 60 may be implemented with a second printed circuit board 61 and various circuits mounted on the second printed circuit board 61. For example, the power circuit may include a capacitor, a coil, a resistor element, a processor, or the like, and the first printed circuit board 51 on which these components are mounted. In addition, the control circuit may include a memory, a processor, and the second printed circuit board 61 on which these components are mounted.

The power assembly 50 and the control assembly 60 may be disposed between the bottom chassis 15 and the rear cover 16. The power assembly 50 and the control assembly 60 may be supported by the bottom chassis 15.

As illustrated in FIG. 3, the bottom chassis 15 may include a cover body 150 that is disposed on a rear side (for example, in a-X direction) of the back light unit 100, and support protrusions 151 that protrude rearward from the cover body 150.

The support protrusions 151 may be provided as a pair to protrude from the cover body 150 toward the rear cover 16 so as to support the power assembly 50 and the control assembly 60. However, in case where the power assembly 50 and the control assembly 60 are integrally formed, the pair of support protrusions 151 may be integrally formed and may extend in a length direction (for example, in a Y direction) of the display apparatus 10.

Figure 4:
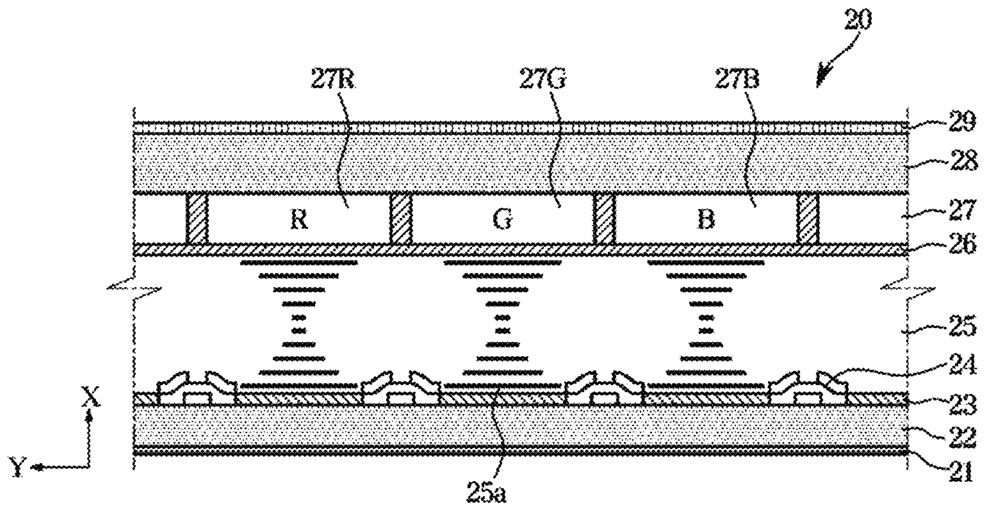
FIG. 4 is a view illustrating an example of a liquid crystal panel included in a display apparatus, according to an embodiment of the present disclosure.

FIG. 4 is a view illustrating an example of a liquid crystal panel included in a display apparatus, according to an embodiment of the present disclosure.

With reference to FIG. 4, the front surface of the display panel 20 forms the screen of the display apparatus 10 as described above, and may be a liquid crystal panel 20. The liquid crystal panel 20 may block or transmit light from the back light unit 100 for each of a plurality of pixels, independently.

The liquid crystal panel 20 may include a first polarizing film 21, a first transparent substrate 22, a pixel electrode 23, a thin film transistor 24, a liquid crystal layer 25, a common electrode 26, a color filter 27, a second transparent substrate 28, and a second polarizing film 29.

The first transparent substrate 22 and the second transparent substrate 28 may fix or support the pixel electrode 23, the thin film transistor 24, the liquid crystal layer 25, the common electrode 26, and the color filter 27. The first transparent substrate 22 and the second transparent substrate 28 may be composed of reinforced glass or transparent resin.

The first polarizing film 21 and the second polarizing film 29 may be provided on outer sides of the first transparent substrate 22 and the second transparent substrate 28. The first polarizing film 21 and the second polarizing film 29 may each transmit a specific polarization and block (reflect or absorb) other polarization. For example, the first polarizing film 21 may transmit polarization in a first direction and block (reflect or absorb) other polarization. In this case, the first direction and the second direction may be orthogonal to each other. Accordingly, polarization that has passed through the first polarizing film 21 may not directly pass through the second polarizing film 29.

The color filter 27 may be provided on an inner side of the second transparent substrate 28. The color filter 27 may include, for example, a red filter 27R that transmits red light, a green filter 27G that transmits green light, and a blue filter 27B that transmits blue light. In addition, the red filter 27R, the green filter 27G, and the blue filter 27B may be disposed in parallel with each other. A region occupied by the color filter 27 may correspond to the pixel described above. A region occupied by the red filter 27R corresponds to a red sub-pixel, a region occupied by the green filter 27G corresponds to a green sub-pixel, and a region occupied by the blue filter 27B corresponds to a blue sub-pixel.

The pixel electrode 23 may be provided on an inner side of the first transparent substrate 22, and the common electrode 26 may be provided on an inner side of the second transparent substrate 28. The pixel electrode 23 and the common electrode 26 may be formed of an electrically conductive metal material, and may generate an electric field for changing the disposition of liquid crystal molecules 25*a* constituting the liquid crystal layer 25.

The thin film transistor (TFT) 24 may be provided on an inner side of the second transparent substrate 28. The thin film transistor 24 may be turned on (closed) or turned off (open) according to image data provided from the panel driver 30. In addition, an electric field may be formed or removed between the pixel electrode 23 and the common electrode 26 according to the turn-on (closed) or turn-off (open) of the thin film transistor 24.

The liquid crystal layer 25 is formed between the pixel electrode 23 and the common electrode 26, and may be filled with liquid crystal molecules 25*a*. The liquid crystal may represent an intermediate state between a solid (crystal) and a liquid. The liquid crystal may exhibit optical properties depending on a change in electric field. For example, according to a change in the electric field, the orientation of molecular arrangement constituting the liquid crystal may change. Accordingly, the optical properties of the liquid crystal layer 25 may vary depending on the presence or absence of the electric field passing through the liquid crystal layer 25. For example, the liquid crystal layer 25 may rotate the polarization direction of light about an optical axis depending on the presence or absence of an electric field. Accordingly, the polarization that has passed through the first polarizing film 21 may have its polarization direction rotated while passing through the liquid crystal layer 25, and may pass through the second polarizing film 29.

Figure 5:
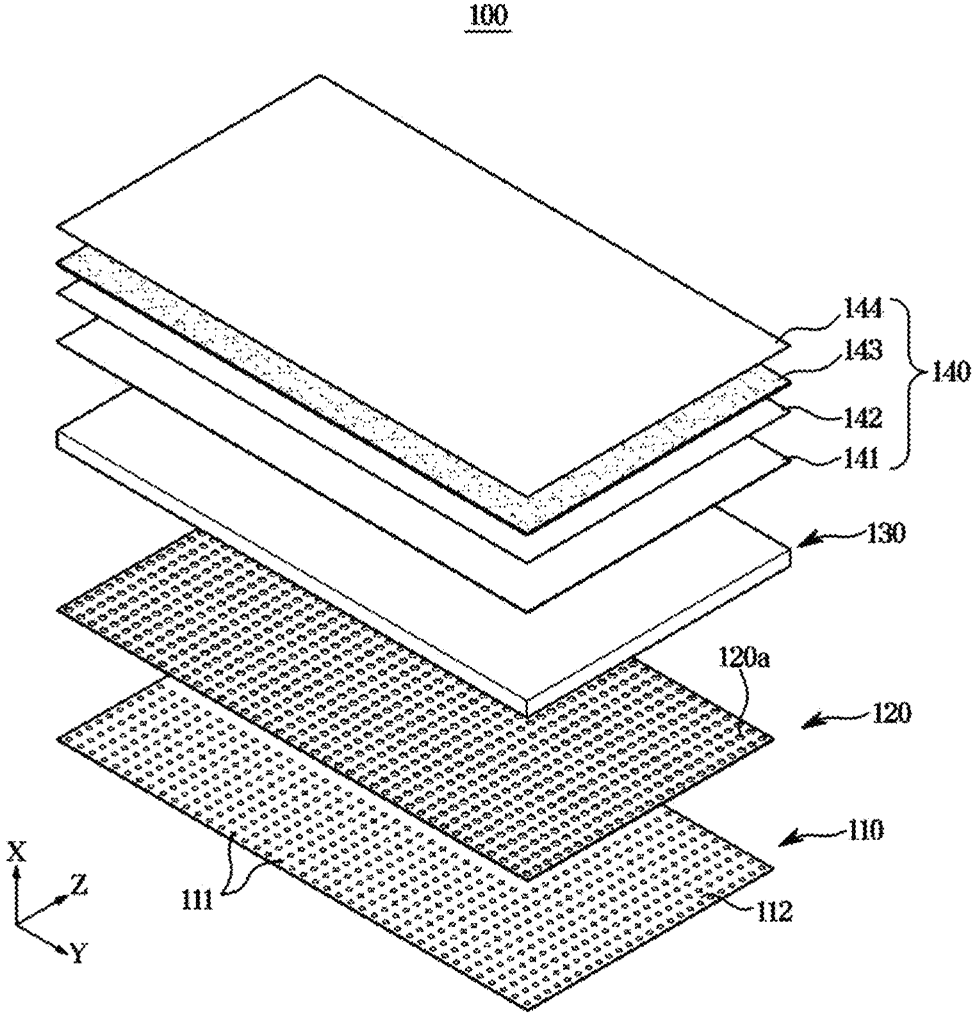
FIG. 5 is a view illustrating an example of a back light unit (BLU) included in a display apparatus, according to an embodiment of the present disclosure.

FIG. 5 is a view illustrating an example of a back light unit (BLU) included in a display apparatus, according to an embodiment of the present disclosure.

With reference to FIG. 5, the back light unit 100 may include a light source module 110 that generates light, a reflective sheet 120 that reflects light, a diffuser plate 130 that uniformly diffuses light, and an optical sheet 140 that improves the luminance of emitted light.

The light source module 110 may include a plurality of light sources 111 that emit light, and a light source substrate 112 that supports the plurality of light sources 111 to fix them in place.

The plurality of light sources 111 may be disposed in a predetermined pattern such that light is emitted with uniform luminance. The plurality of light sources 111 may be disposed such that the distance between one light source and adjacent light sources becomes equal. The plurality of light sources 111 may supply light to the display panel 20 (see FIG. 2).

For example, as illustrated in FIG. 5, the plurality of light sources 111 may be arranged in alignment with rows and columns. For example, the plurality of light sources may be disposed such that a substantially square shape is formed by four adjacent light sources. In addition, any one light source may be disposed adjacent to four light sources, and the distance between the one light source and the four adjacent light sources may be substantially equal.

In addition, according to an embodiment, the plurality of light sources may be disposed such that a substantially equilateral triangle is formed by three adjacent light sources. In this case, one light source may be disposed adjacent to six light sources. Additionally, the distance between one light source and the six adjacent light sources may be substantially equal.

However, the disposition of the plurality of light sources 111 is not limited to the above-described disposition, and the plurality of light sources 111 may be variously disposed so that light is emitted with uniform luminance.

The light source 111 may employ an element that, when power is supplied, may emit monochromatic light (light having a specific wavelength, for example, blue light) or white light (for example, light mixed with red light, green light, and blue light) in various directions. For example, the light source 111 may include a light emitting diode (LED). The light emitting diode may be implemented in various sizes, and may include, for example, a Mini LED and/or a Micro LED.

The light source substrate 112 may fix the plurality of light sources 111 in place so that the positions of the light sources 111 are not changed. In addition, the light source substrate 112 may supply power to each light source 111 so that the light source 111 emits light.

The light source substrate 112 may fix the plurality of light sources 111, and may include a synthetic resin and/or reinforced glass and/or a printed circuit board (PCB) in which a conductive power supply line for supplying (e.g., configured to supply) power to the light sources 111 is formed.

The reflective sheet 120 may reflect light emitted from the plurality of light sources 111 forward (for example, in an X direction) or in a direction approximate to the forward direction.

A plurality of through-holes 120*a* may be formed in the reflective sheet 120 at positions corresponding to each of the plurality of light sources 111 of the light source module 110. In addition, the light sources 111 of the light source module 110 may protrude on a front side (for example, in the X direction) of the reflective sheet 120 through the through-holes 120*a*.

For example, during the assembly process of the reflective sheet 120 and the light source module 110, the plurality of light sources 111 of the light source module 110 may be inserted into the plurality of through-holes 120*a* formed in the reflective sheet 120. Accordingly, although the light source substrate 112 of the light source module 110 is located on a rear side (for example, in a-X direction) of the reflective sheet 120, the plurality of light sources 111 of the light source module 110 may be located on a front side of the reflective sheet 120.

As a result, the plurality of light sources 111 may emit light from the front side (for example, in the X direction) of the reflective sheet 120.

The plurality of light sources 111 may emit light in various directions from the front side (for example, in the X direction) of the reflective sheet 120. Light may be emitted not only from the light source 111 toward the diffuser plate 130, but also from the light source 111 toward the reflective sheet 120, and the reflective sheet 120 may reflect the light emitted toward the reflective sheet 120 toward the diffuser plate 130.

The light emitted from the light source 111 may pass through various objects, such as the diffuser plate 130 and the optical sheet 140. When the light passes through the diffuser plate 130 and the optical sheet 140, a portion of the incident light may be reflected at the surfaces of the diffuser plate 130 and the optical sheet 140 when the portion of the incident light passes through the diffuser plate 130 and the optical sheet 140. The reflective sheet 120 may reflect the light reflected by the diffuser plate 130 and the optical sheet 140.

The diffuser plate 130 may be provided on the front side (for example, in an X direction) of the light source module 110 and the reflective sheet 120, and may uniformly disperse light emitted from the light source 111 of the light source module 110.

As described above, the plurality of light sources 111 may be located in various positions on the rear surface of the back light unit 100. Although the plurality of light sources 111 may be disposed at equal intervals on the rear surface of the back light unit 100, luminance non-uniformity may occur depending on the positions of the plurality of light sources 111.

The diffuser plate 130 may diffuse light emitted from the plurality of light sources 111 within the diffuser plate 130 to eliminate luminance non-uniformity caused by the plurality of light sources 111. In other words, the diffuser plate 130 may uniformly emit forward non-uniform light from the plurality of light sources 111.

The optical sheet 140 may include various sheets for improving luminance and luminance uniformity. For example, the optical sheet 140 may include a diffusion sheet 141, a first prism sheet 142, a second prism sheet 143, a reflective polarizing sheet 144, or the like.

The diffusion sheet 141 may diffuse light to ensure luminance uniformity. The light emitted from the light source 111 may be diffused by the diffuser plate 130, and may be further diffused by the diffusion sheet 141 included in the optical sheet 140.

The first prism sheet 142 and the second prism sheet 143 may increase luminance by collecting light diffused by the diffusion sheet 141. The first prism sheet 142 and the second prism sheet 143 may include prism patterns in the form of triangular prisms, and the prism patterns may be arranged adjacently in plurality to form a plurality of strip shapes.

The reflective polarizing sheet 144, which is a type of polarizing film, may transmit a portion of incident light and reflect another portion of the light to enhance luminance. For example, it is possible to transmit polarization in the same direction as a predetermined polarization direction of the reflective polarizing sheet 144 and reflect polarization in a direction different from the polarization direction of the reflective polarizing sheet 144. In addition, the light reflected by the reflective polarizing sheet 144 may be recycled inside the back light unit 100, and such light recycle may improve the luminance of the display apparatus 10.

The optical sheet 140 is not limited to sheets or films, and may include various sheets or films, such as protective sheets or the like.

Figure 6:
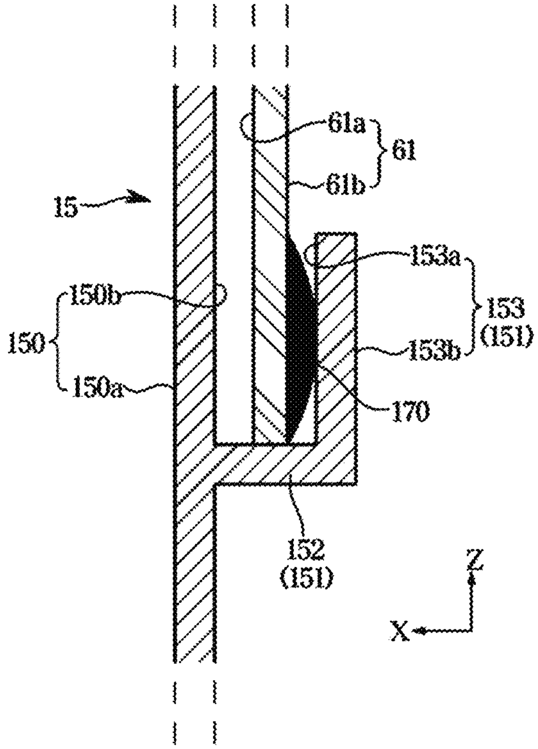
FIG. 6 is a cross-sectional side view illustrating a support protrusion, a substrate, and a soldering portion, according to an embodiment of the present disclosure, based on a schematic cross-sectional side view taken along line A-A' illustrated in FIG. 3.

FIG. 6 is a cross-sectional side view illustrating a support protrusion, a substrate, and a soldering portion, according to an embodiment of the present disclosure, based on a schematic cross-sectional side view taken along line A-A' illustrated in FIG. 3.

With reference to FIG. 6, the bottom chassis 15 may include the cover body 150 disposed on the rear side (for example, in a-X direction) of the back light unit 100, and the support protrusion 151 protruding rearward (for example, in a −X direction) from the cover body 150.

The cover body 150 may be provided in a substantially rectangular plate shape, and may include a first body surface 150*a* facing the back light unit 100 and a second body surface 150*b* facing the rear cover 16 (see FIG. 2). The first body surface 150*a* may be a front surface of the cover body 150, and the second body surface 150*b* may be a rear surface of the cover body 150.

The support protrusion 151 may be a protrusion that protrudes from the second body surface 150*b* of the cover body 150. The support protrusion 151 may be provided in a bent shape having an "L" shape facing forward so as to support the power assembly 50 (see FIG. 3) or the control assembly 60. The support protrusion 151 may include a support portion 152 connected to the cover body 150, and a bending portion 153 that extends upward (for example, in a Z direction) from the support portion 152.

The support portion 152 may support the first printed circuit board 51 and the second printed circuit board 61. The bending portion 153 may be disposed on a rear side of the first printed circuit board 51 and the second printed circuit board 61. With such a structure, the first printed circuit board 51 and the second printed circuit board 61 may be disposed between the bending portion 153 and the cover body 150.

Because the structure in which the support protrusion 151 supports the first printed circuit board 51 of the power assembly 50 and the structure in which the support protrusion 151 supports the second printed circuit board 61 of the control assembly 60 may correspond to each other, hereinafter, only the structure of the support protrusion 151 supporting the second printed circuit board 61 of the control assembly 60 will be described, and the description of the structure supporting the first printed circuit board 51 will be omitted.

The support protrusion 151 may be provided to support the second printed circuit board 61. Meanwhile, when the second printed circuit board 61 comes into direct contact with the support protrusion 151 or the cover body 150, although the second printed circuit board 61 may be stably supported, there may be a concern that the second printed circuit board 61 may be scratched or damaged during assembly or movement.

In consideration of this, there have been cases in which the second printed circuit board 61 is fixed such that it is spaced apart from the bottom chassis 15 by using a separate member such as a gasket tape or sponge, etc. However, in this case, additional manufacturing costs may be incurred, and there may be cases where the GND surface of the second printed circuit board 61 may not be extended.

To solve such a problem, according to the spirit of the present disclosure, the second printed circuit board 61 may be provided to be soldered to the bottom chassis 15. That is, as illustrated in FIG. 6, the second printed circuit board 61 may be provided to be soldered to the support protrusion 151.

The second printed circuit board 61 may include a front surface 61*a* facing the cover body 150, and a rear surface 61*b* facing the rear cover 16. A front surface 153*a* of the bending portion 153 may face the second printed circuit board 61, and a rear surface 153*b* of the bending portion 153 may face the rear cover 16.

A soldering portion 170 is provided on the rear surface 61*b* of the second printed circuit board 61 and may be provided rearward (for example, in a-Y direction) so as to come into contact with the front surface 153*a* of the bending portion 153. That is, the second printed circuit board 61 may be soldered rearward (for example, in a-Y direction) toward the support protrusion 151.

The soldering portion 170 may fix the second printed circuit board 61 to the bottom chassis 15.

Meanwhile, although not illustrated in the drawings, each of the second printed circuit board 61 or the first printed circuit board 51 may be provided with a ground plane (GND plane) in a region other than a region including the control circuit or the power circuit. The ground plane (GND plane) may refer to a copper layer (copper foil) that serves as a ground in the control circuit or the power circuit. For example, in a multilayer PCB having multiple layers, the ground plane may occupy an independent layer.

In the printed circuit boards 51 and 61, a ground plane (GND plane) may be provided to prevent interference between power signals and control signals. Due to the ground plane, the printed circuit boards 51 and 61 may achieve electromagnetic (EM) shielding. More specifically, unnecessary electromagnetic interference (EMI) generated from the power circuit or the control circuit may be blocked from affecting other components. This is because electromagnetic waves cannot penetrate conductors, and therefore cannot penetrate the ground plane (GND plane) composed of copper foil or the like.

According to the spirit of the present disclosure, the soldering portion 170 may electrically connect the ground plane of the printed circuit boards 51 and 61 to the bottom chassis 15. With such a structure, the ground electrical characteristics of the printed circuit boards 51 and 61 may be stabilized. More specifically, by connecting the ground plane of the printed circuit boards 51 and 61 to the bottom chassis 15, the ground of the printed circuit boards 51 and 61 may be extended to the bottom chassis 15, thereby improving ground capacity, and other components may be relatively less interfered with, thereby stabilizing electrical characteristics.

Here, the electrical characteristics being stabilized means that electromagnetic interference (EMI) and electrostatic discharge (ESD) performance of the printed circuit boards 51 and 61 is secured. Electromagnetic interference (EMI) refers to a state in which noise generated in an electronic device interferes with other electronic devices. In addition, electrostatic discharge (ESD) refers to an electrostatic phenomenon in which charges accumulated in an object due to friction instantaneously discharge when the object comes into contact with another object. According to the spirit of the present disclosure, because the first printed circuit board 51 and the second printed circuit board 61 are soldered to the bottom chassis 15, and the electrical capacitance of the first printed circuit board 51 and the second printed circuit board 61 is extended to the bottom chassis 15, EMI and ESD phenomena may be prevented.

For such a structure, the bottom chassis 15, which includes the cover body 150 and the support protrusion 151, may be made of a metal material. In addition, the soldering portion 170 may connect the support protrusion 151 and the ground plane of the printed circuit boards 51 and 61.

Additionally, the ground plane of the printed circuit boards 51 and 61 and one surface of the bottom chassis 15 are in parallel so that the ground may not be extended to the bottom chassis 15 when the printed circuit boards 51 and 61 are not brought into close contact with the bottom chassis 15. On the other hand, when the ground plane of the printed circuit boards 51 and 61 and one surface of the bottom chassis 15 are brought into close contact, damage may occur to the printed circuit boards 51 and 61. In this regard, because the soldering portion 170 according to the spirit of the present disclosure connects the ground plane of the printed circuit boards 51 and 61 to the bottom chassis 15 while being spaced apart, damage to the printed circuit boards 51 and 61 may be prevented, and at the same time, the ground may be extended to the bottom chassis 15, thereby stabilizing the electrical characteristics.

The bending portion 153 of the support protrusion 151 may be disposed on a lower portion of the rear surface 61*b* of the second printed circuit board 61, and accordingly, the soldering portion 170 may be provided on a lower portion of the second printed circuit board 61.

As illustrated in FIG. 6, the front surface 61*a* of the second printed circuit board 61 and the second surface 150*b* of the cover body 15 may be disposed while being spaced apart. The spaced disposition of the second printed circuit board 61 from the cover body 15 may be for the purpose of protecting the front surface 61*a* of the second printed circuit board 61.

Therefore, according to the structure illustrated in FIG. 6, the second printed circuit board 61 may be disposed in a manner spaced apart from the cover body 150 and the bending portion 153, thereby preventing damage to the second printed circuit board 61, and at the same time, due to the configuration of the soldering portion 170, the ground may be extended to the chassis 15.

Figure 7:
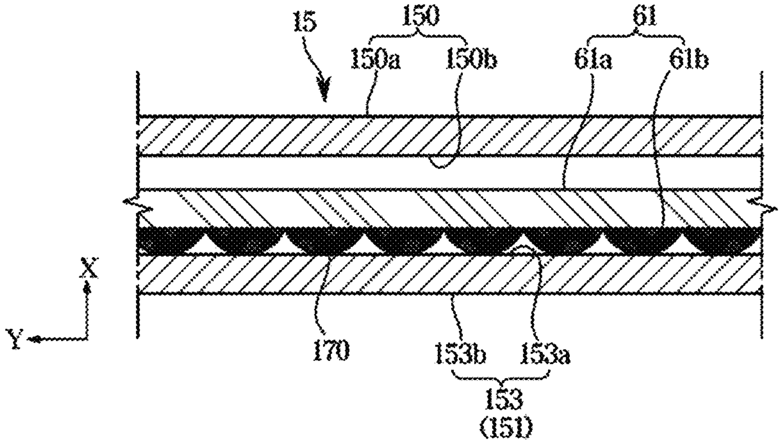
FIG. 7 is a view illustrating a structure in which the soldering portion illustrated in FIG. 6 is provided in a continuous manner.

FIG. 7 is a view illustrating a structure in which the soldering portion illustrated in FIG. 6 is provided in a continuous manner. With reference to FIG. 7, the soldering portion 170 may be provided in plurality. More specifically, the soldering portion 170 may be continuously disposed in a length direction (for example, in a Y direction) of the cover body 15.

The soldering portion 170 may be provided on the rear surface 61*b* of the second printed circuit board 61, and may protrude toward the support protrusion 151. The soldering portion 170 may be continuously arranged in the length direction of the display panel 20 (see FIG. 2) so as to connect the rear surface 61*b* of the second printed circuit board 61 to the front surface 153*a* of the bending portion 153.

According to such a structure, with the structure of a plurality of soldering portions instead of the structure of a single soldering portion, the second printed circuit board 61 may be more stably supported to the bottom chassis 15, and at the same time, ground extension may be more stabilized.

Figure 8:
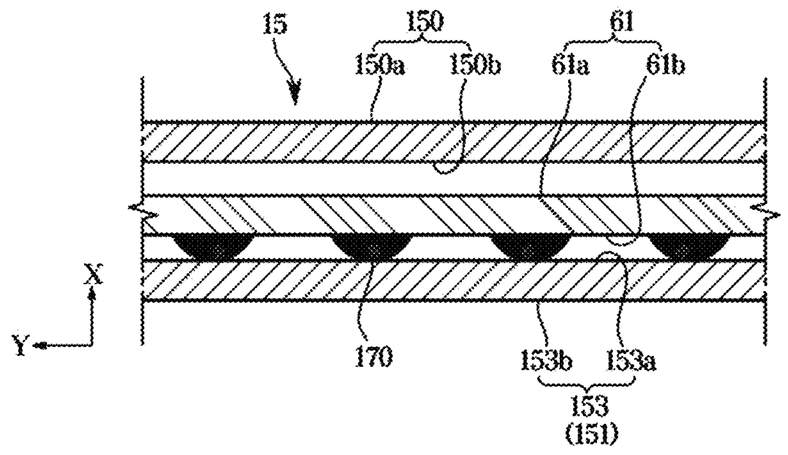
FIG. 8 is a view illustrating a structure in which the soldering portion illustrated in FIG. 6 is disposed in a spaced manner.

FIG. 8 is a view illustrating a structure in which the soldering portion illustrated in FIG. 6 is disposed in a spaced manner. With reference to FIG. 8, the soldering portion 170 may be provided in plurality in a length direction (for example, in a Y direction) of the display apparatus 10 (see FIG. 1), and may be spaced apart from each other.

The effect of the structure described above is as previously described. However, unlike the continuous disposition of the soldering portion 170 illustrated in FIG. 7, the soldering portions may be spaced apart from each other to connect the second printed circuit board 61 to the support protrusion 151.

Figure 9:
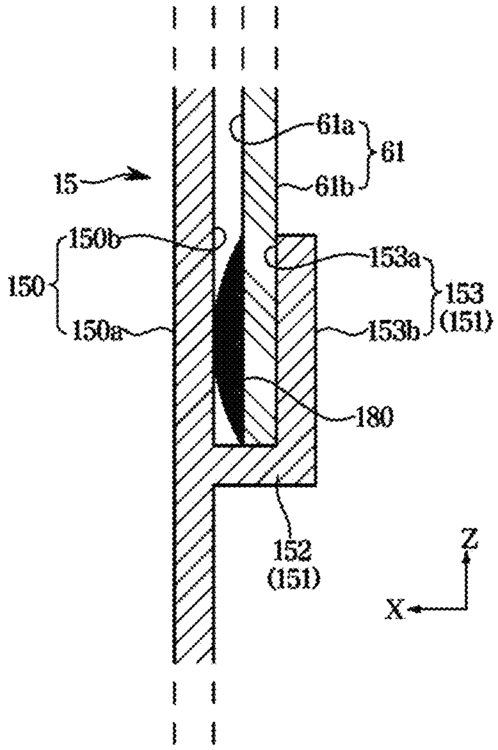
FIG. 9 is a cross-sectional side view illustrating a support protrusion, a substrate, and a soldering portion, according to an embodiment of the present disclosure, based on a cross-sectional side view taken along line A-A' illustrated in FIG. 3.

FIG. 9 is a cross-sectional side view illustrating a support protrusion, a substrate, and a soldering portion, according to an embodiment of the present disclosure, based on a cross-sectional side view taken along line A-A' illustrated in FIG. 3.

With reference to FIG. 9, unlike the structure illustrated in FIG. 6, a soldering portion 180 may be provided between the second printed circuit board 61 and the cover body 150. That is, the soldering portion 180 is a structure that connects the second printed circuit board 61 to the cover body 150.

More specifically, the soldering portion 180 may be provided on the front surface 61*a* of the second printed circuit board 61 and may protrude toward the second body surface 150*b*, which faces a direction opposite to the first body surface 150*a* of the cover body 150. That is, the second printed circuit board 61 may be soldered forward (for example, in an X direction) to the second body surface 150*b* of the cover body 150 so as to be connected to the cover body 150.

Because the soldering portion 180 directly connects the ground plane of the second printed circuit board 61 to the second surface 150*b* of the cover body 150, the electrical characteristics of the second printed circuit board 61 may be stabilized. In addition, due to the structure of the soldering portion 180, the cover body 150 and the second printed circuit board 61 are spaced apart to prevent them from coming into direct contact, while the second printed circuit board 61 may be supported more stably by the support protrusion 151. That is, because the soldering portion 180 is provided between the front surface 61*a* of the second printed circuit board 61 and the second surface 150*b* of the cover body 150, the second printed circuit board 61 may be spaced apart rearward (for example, in a-X direction) from the cover body 150, thereby preventing damage to the second printed circuit board 61.

Meanwhile, the support protrusion 151 supports the rear surface 61*b* of the second printed circuit board 61, and even in case of direct contact, because the support protrusion 151 is disposed at a lower portion of the rear surface 61*b* of the second printed circuit board 61, damage to the control circuit or power circuit may be minimized.

As such, the soldering portion 180 illustrated in FIG. 9 may be used to extend the GND of the second printed circuit board 61, and at the same time, to prevent damage to the second printed circuit board 61.

Figure 10:
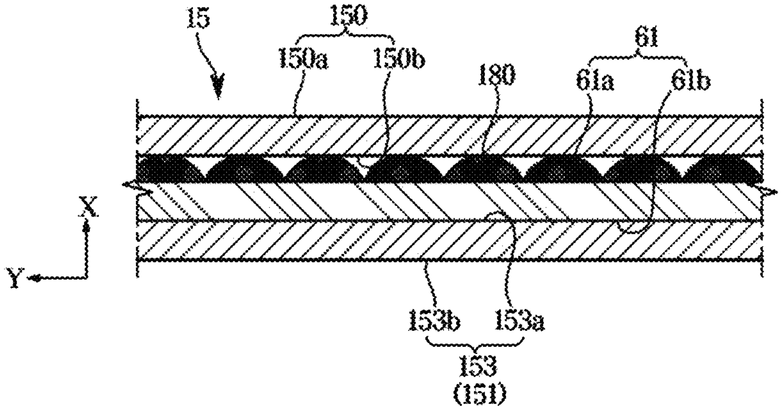
FIG. 10 is a view illustrating a structure in which the soldering portion illustrated in FIG. 9 is provided in a continuous manner.

FIG. 10 is a view illustrating a structure in which the soldering portion illustrated in FIG. 9 is provided in a continuous manner. With reference to FIG. 10, the soldering portion 180 may be provided in plurality. The soldering portions 180 may be arranged in a length direction (for example, in a Y direction) of the cover body 150. The plurality of soldering portions 180 may be provided continuously.

According to the structure illustrated in FIG. 10, due to the soldering portion 180 being provided in plurality rather than the soldering portion 180 being provided in singularity, the second printed circuit board 61 may be more stably supported to the bottom chassis 15, and the ground of the second printed circuit board 61 may be more stably extended, thereby increasing the ground capacity.

Figure 11:
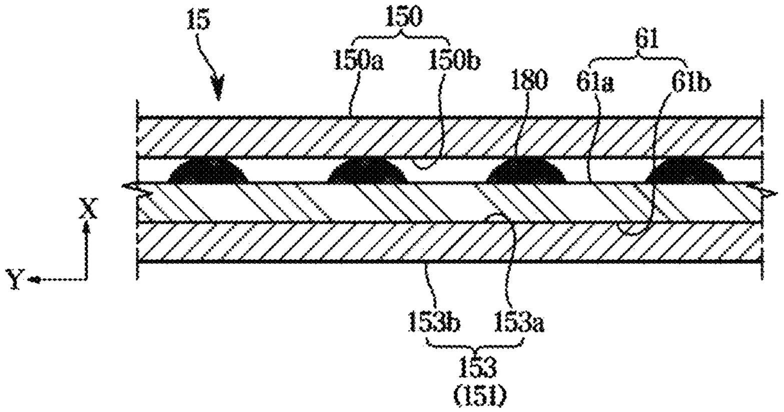
FIG. 11 is a view illustrating a structure in which the soldering portion illustrated in FIG. 9 is disposed in a spaced manner.

FIG. 11 is a view illustrating a structure in which the soldering portion illustrated in FIG. 9 is disposed in a spaced manner. With reference to FIG. 11, the plurality of soldering portions 180 may protrude from the front surface 61*a* of the second printed circuit board 61 toward the second body surface 150*b* of the cover body 150 while being spaced apart from each other, and may be disposed spaced apart from each other in the length direction (for example, in a Y direction) of the bottom chassis 15.

According to the structure of FIG. 11, in correspondence with the effect of the structure of FIG. 10, the second printed circuit board 61 may be supported on the bottom chassis 15 such that damage is prevented, and the ground of the second printed circuit board 61 may be more stably extended, thereby stabilizing the electrical characteristics.

As described above, according to the spirit of the present disclosure, it is possible to reduce manufacturing costs of separate auxiliary materials such as sponge or gasket tape used to fix the printed circuit boards 51 and 61 to the bottom chassis 15.

The above describes and illustrates specific embodiments. However, the present disclosure is not limited to the specific embodiments described above, and a person skilled in the art to which the present disclosure pertains would be able to make various modifications without departing from the scope of the technical spirit of the present disclosure as set forth in the following claims.

A display apparatus 10 according to an embodiment may include a display panel 20 that displays an image, a light source 111 that supplies light to the display panel 20 and is disposed on a rear side of the display panel, and a chassis 15 including a cover body 150 that is disposed on a rear side of the light source and covers a rear surface of the light source, and a support protrusion 151 that protrudes from a rear surface 150*b* of the cover body and is bent. The display apparatus 10 according to an embodiment may further include a substrate 51 or 61 that is supported by the support protrusion 151 and is disposed between the cover body 150 and the support protrusion 151. The substrate 51 or 61 may be provided to be soldered to the chassis 15 from one surface 61*a* or 61*b*. According to the spirit of the present disclosure, in the display apparatus 10, because the substrate 51 or 61 is soldered to the chassis 15, the ground of the substrate 51 or 61 may be extended to the chassis 15.

The one surface of the substrate 61 may be a rear surface 61*b* of the substrate. The substrate 61 may be soldered rearward toward the support protrusion 151.

The support protrusion 151 may include a support portion 152 connected to the cover body 150, and a bending portion 153 that extends from the support portion 152 in parallel with the cover body 150. The substrate 61 may be soldered to the bending portion 153.

The substrate 61 may be disposed spaced apart from the cover body 150 and the bending portion 153. According to the spirit of the present disclosure, because the substrate 51 or 61 of the display apparatus 10 is disposed spaced apart from the chassis 15, damage to the substrate 51 or 61 may be prevented.

The one surface of the substrate 61 may be a front surface 61*a* of the substrate. The substrate 61 may be soldered forward to be connected to the chassis 15.

The substrate 61 may be soldered to the rear surface 150*b* of the cover body. According to the spirit of the present disclosure, because the substrate 51 or 61 of the display apparatus 10 is soldered to the rear surface 150*b* of the cover body 150, the ground of the substrate 51 or 61 may be extended, and at the same time, damage to the substrate 51 or 61 may be prevented.

A soldering portion 170 or 180, which is provided to protrude from the one surface 61*a* or 61*b* of the substrate and be connected to the chassis 15, may be provided in plurality, and may be arranged in one direction, which is a length direction of the display panel 20. According to the spirit of the present disclosure, because the substrate 51 or 61 is soldered by a plurality of soldering portions 170 or 180, the substrate 51 or 61 may be more stably connected to the chassis 15.

The soldering portions 170 or 180 may be arranged spaced apart from each other in the one direction.

The soldering portions 170 or 180 may be continuously arranged in the one direction.

The substrate 51 or 61 may be disposed on one rear side of the chassis 15 so as to be connected to the display panel 20 via a chip on film (COF).

The substrate 51 or 61 may be disposed on an upper rear side of the chassis 15. The support protrusion 151 may include a support portion 152 connected to the cover body 150, and a bending portion 153 that extends upward from the support portion 152.

The chassis 15 may be made of metal. According to the spirit of the present disclosure, because the chassis 15 of the display apparatus 10 is made of metal, the ground of the substrate 51 or 61 may be extended to the chassis 15, so that the electrical characteristics may be stabilized.

A display apparatus 10 according to an embodiment may include a display panel 20 that displays an image, a light source 111 that supplies light to the display panel 20 and is disposed on a rear side of the display panel, and a chassis 15 that is disposed on a rear side of the light source 111 and covers a rear surface of the light source. The display apparatus 10 according to an embodiment may include a substrate 51 or 61, which is connected to the display panel 20 and disposed on a rear side of the chassis, and which is soldered to the chassis 15 from one surface 61*a* or 61*b* of the substrate 61. According to the spirit of the present disclosure, in the display apparatus 10, because the substrate 51 or 61 is soldered to the chassis 15, the ground of the substrate 51 or 61 may be extended to the chassis 15.

The chassis 15 may include a support protrusion 151 that protrudes rearward to support the substrate. The substrate 51 or 61 may be supported by the support protrusion 151.

The one surface of the substrate 51 or 61 may be a rear surface 61*b* of the substrate. The substrate 51 or 61 may be soldered rearward toward the support protrusion 151.

The chassis 15 may further include a cover body 150 that covers the rear surface of the light source 111. The support protrusion 151 may include a support portion 152 connected to the cover body 150 and supporting the substrate, and a bending portion 153 that is bent from the support portion to cover the rear surface of the substrate. The substrate 51 or 61 may be soldered to the bending portion 153. Because the substrate 51 or 61 of the display apparatus 10 is disposed spaced apart from the chassis 15, damage to the substrate 51 or 61 may be prevented.

The one surface of the substrate 51 or 61 may be a front surface 61*a* of the substrate. The substrate 51 or 61 may be soldered forward to be connected to the chassis 15.

The chassis 15 may include a cover body 150, which is connected to the support protrusion and covers the rear surface of the light source 111. The substrate 15 may be soldered to the cover body 150. According to the spirit of the present disclosure, because the substrate 51 or 61 of the display apparatus 10 is soldered to the rear surface 150*b* of the cover body 150, the ground of the substrate 51 or 61 may be extended, and at the same time, damage to the substrate 51 or 61 may be prevented.

A soldering portion 170 or 180, which is provided to protrude from the one surface 61*a* or 61*b* of the substrate 51 or 61 to be connected to the chassis, may be provided in plurality, and may be arranged in a length direction of the display panel 20. According to the spirit of the present disclosure, because the substrate 51 or 61 is soldered by a plurality of soldering portions 170 or 180, the substrate 51 or 61 may be more stably connected to the chassis 15.

A display apparatus 10 according to an embodiment may include a display panel 20 that displays an image, a light source 111 that supplies light to the display panel 20 and is disposed on a rear side of the display panel, and a chassis 15 including a cover body 150 that is disposed on a rear side of the light source 111 and covers a rear surface of the light source, and a support protrusion 151 that protrudes from a rear surface of the cover body and is bent. The display apparatus 10 according to an embodiment may include a substrate 51 or 61 that is connected to the display panel 20 via bent chip on film (COF) and is disposed on a rear side of the chassis. The substrate 51 or 61 may be disposed between the cover body 150 and the support protrusion 151, and may be provided to be soldered to the chassis 15 from one surface 61*a* or 61*b*. According to the spirit of the present disclosure, in the display apparatus 10, because the substrate 51 or 61 is soldered to the chassis 15, the ground of the substrate 51 or 61 may be extended to the chassis 15.

According to the spirit of the present disclosure, because the substrate 51 or 61 of the display apparatus 10 is soldered to the chassis 15, the ground of the substrate 51 or 61 may be extended to the chassis 15 made of metal, and the electrical characteristics of the display apparatus 10 may be stabilized.

According to the spirit of the present disclosure, because the substrate 51 or 61 of the display apparatus 10 is soldered to the chassis 15, electromagnetic interference (EMI) and electrostatic discharge (ESD) of the display apparatus 10 may be prevented.

According to the spirit of the present disclosure, because the substrate 51 or 61 of the display apparatus 10 are spaced apart from or minimally contacted with the chassis 15, damage to the substrate 51 or 61 may be prevented.

According to the spirit of the present disclosure, because the substrate 51 or 61 of the display apparatus 10 is joined to the chassis 15 without separate auxiliary materials, the cost of separate auxiliary materials or the manufacturing process may be simplified.

The effects according to the spirit of the present disclosure are not limited to the effects mentioned above, and other effects not mentioned may be clearly understood by those of ordinary skill in the art to which the present disclosure pertains from the following description.

What is claimed is:

1. A display apparatus, comprising:

a display panel configured to display an image;

a light source configured to supply light to the display panel, the light source being provided on a rear side of the display panel;

a chassis provided on a rear side of the light source, the chassis comprising a cover body covering a rear surface of the light source, and a support protrusion, that is bent, protruding from a rear surface of the cover body; and a substrate supported by the support protrusion and provided between the cover body and the support protrusion, wherein a front surface of the substrate is spaced apart from the rear surface of the cover body, wherein the substrate is configured to be soldered to the chassis from one surface thereof, wherein a soldering portion, which is provided to protrude from the one surface of the substrate and be connected to the chassis, is provided in a plurality of soldering portions that are arranged in one direction, which is a length direction of the display panel, and wherein the plurality of soldering portions are arranged continuously in the one direction.

2. The display apparatus of claim 1, wherein the one surface of the substrate is a rear surface of the substrate, and the substrate is soldered rearward toward the support protrusion.

3. The display apparatus of claim 2, wherein the support protrusion comprises:

a support portion connected to the cover body; and a bending portion extending from the support portion in parallel with the cover body, and wherein the substrate is soldered to the bending portion.

4. The display apparatus of claim 3, wherein the substrate is spaced apart from the cover body and the bending portion.

5. The display apparatus of claim 1, wherein the one surface of the substrate is the front surface of the substrate, and the substrate is soldered forward to be connected to the chassis.

6. The display apparatus of claim 1, wherein the substrate is soldered to the rear surface of the cover body.

7. The display apparatus of claim 1, wherein the substrate is provided on one rear side of the chassis so as to be connected to the display panel via a chip on film (COF).

8. The display apparatus of claim 7, wherein the substrate is provided on an upper rear side of the chassis, and wherein the support protrusion comprises:

a support portion connected to the cover body; and a bending portion that extends upward from the support portion.

9. The display apparatus of claim 1, wherein the chassis is metal.

* * * * *